Sept. 15, 1931.  S. R. PUFFER ET AL  1,823,841
LIQUID TACHOMETER
Filed Dec. 29, 1926
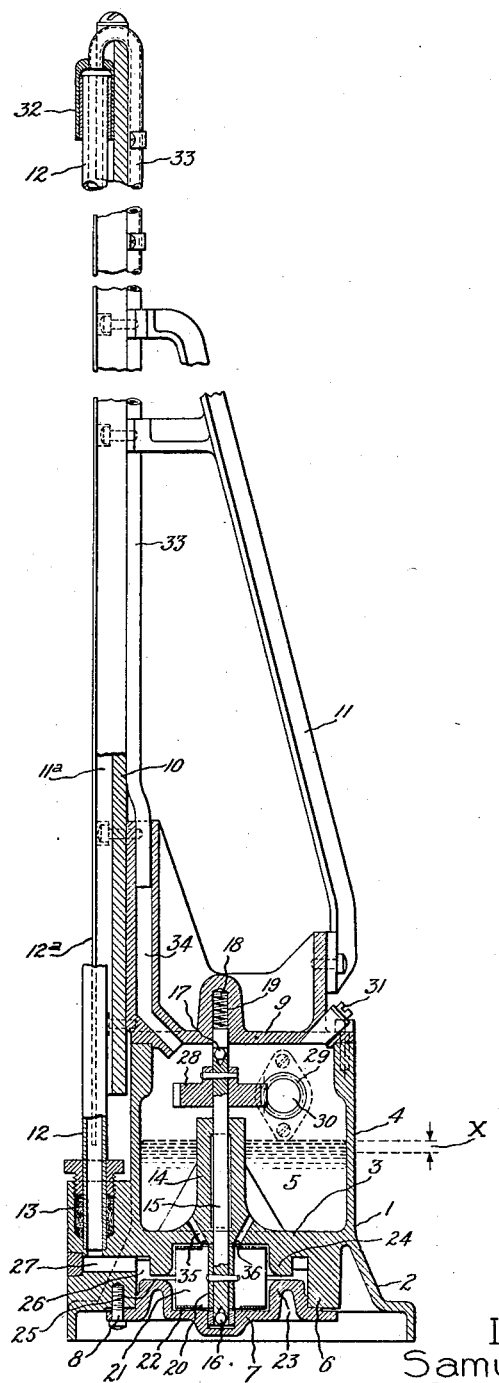
Inventors:
Samuel R. Puffer,
Sanford A. Moss,
by
Their Attorney.

Patented Sept. 15, 1931

1,823,841

UNITED STATES PATENT OFFICE

SAMUEL R. PUFFER AND SANFORD A. MOSS, OF LYNN, MASSACHUSETTS, ASSIGNORS TO GENERAL ELECTRIC COMPANY, A CORPORATION OF NEW YORK

LIQUID TACHOMETER

Application filed December 29, 1926. Serial No. 157,794.

The present invention relates to tachometers and especially to tachometers of the type used for measuring the speed of rotating shafts and comprising a rotating impeller which is utilized to establish a head of liquid the height of which forms a measure of the speed of rotation of the impeller. Such tachometers are termed ordinarily liquid tachometers.

The object of our invention is to provide an improved tachometer of this type which will indicate rotative speeds with a high degree of accuracy, maintain this accuracy over long periods of time and at the same time be capable of manufacture on a commercial basis. In this connection it is pointed out that liquid tachometers now in use so far as we are aware, are primarily laboratory instruments. That is, each instrument is specially fitted and calibrated, and requires adjustment and calibration from time to time in order to maintain its accuracy.

By our invention, we provide a liquid tachometer wherein the parts need not be accurately fitted initially, and wherein the parts in an instrument are interchangeable without destroying the calibration of the instrument. Due to this our improved instrument is capable of being manufactured on a commercial basis in that the respective parts may be manufactured in quantities and assembled into instruments without special fitting in the case of each instrument.

For a consideration of what we believe to be novel in our instrument, attention is directed to the accompanying description and the claims appended thereto.

In the drawing, the figure is a vertical, sectional view of a liquid tachometer embodying our invention.

Referring to the drawing, 1 indicates a base having a supporting flange 2 and an intermediate wall 3 which defines with a side wall 4 a liquid supply chamber 5. Depending from intermediate wall 3 is a flange 6 which forms the surrounding wall of a pump chamber, the top wall of which is formed by intermediate wall 3 and the bottom wall of of which is formed by a head or cover plate 7 attached to depending flange 6 by bolts 8.

The top of chamber 5 is closed by a head 9 to which is attached a vertical strip 10 held in position by a suitable brace 11. Strip 10 is provided with a vertically-extending semi-circular recess 11a in which is supported a vertical glass tube 12 which is the tube in which the liquid column stands. Associated with tube 12 is a suitable scale plate 12a. The lower end of tube 12 is sealed into an opening in base 1 by means of a suitable packing gland 13. Projecting upwardly from intermediate wall 3 is a bearing standard 14 in which is located a shaft 15. Shaft 15 is supported at its lower end on a ball thrust bearing 16 in cover plate 7. It is held against vertical movement by a spring pressed ball thrust bearing 17, the spring 18 being located in a pocket 19 in head 9. Mounted on shaft 15 is an impeller comprising a hub 20 and radially-extending vanes 21. Vanes 21 are rectangular and at their upper and lower sides are provided with shrouds or side plates 22. The impeller has a large axial width compared with its diameter. By this I mean that the width of the impeller is at least greater than one-third the diameter of the impeller. Head 7 is provided with an inwardly-projecting portion 23 which defines with a flange 24 depending from intermediate wall 3, an annular diffuser ring 25 surrounding the impeller and communicating at its periphery with an annular discharge chamber 26. Diffuser ring 25 communicates with chamber 26 midway between the upper and lower sides of the impeller, and as will be noted, the diffuser ring 25 is relatively narrow when compared to the width of the impeller. It will be noted that the diffuser extends entirely around the impeller so as to present an uninterrupted annular passage, that is, a passage which receives fluid at all points around the impeller, and that it has parallel flat sides with a rounded approach. Also, it will be noted that in the present instance a diffuser of the vaneless type is illustrated. However, the invention is not limited necessarily to a diffuser of the vaneless type as other types of diffuser may be used.

Discharge chamber 26 is connected by a passage 27 with the lower end of tube 12. Passage 27 communicates with the upper edge of chamber 26 so as to avoid the formation of a pocket or space in which air might accumulate. With this arrangement, chamber 26 can not become airbound.

Mounted on shaft 15 is a worm wheel 28 adapted to be driven by a worm 29 carried by a shaft 30 mounted in a bearing in wall 4. Shaft 30 is located above the normal liquid level in reservoir 5 and there is sufficient clearance around it to serve as an air vent for the reservoir, thus avoiding the use of a special air vent opening. Shaft 30 may be provided with a pulley or other suitable means on its outer end (not shown) whereby it is adapted to be driven from the shaft, the speed of which is to be measured. 31 indicates a filling plug through which liquid (usually oil) may be poured into reservoir 5. The upper end of tube 12 is covered by a cap 32 with which is connected an overflow tube 33 which communicates with a passage 34 connected to reservoir 5. Reservoir 5 is connected to the impeller chamber by a suitable number of passages 35, the radially inner edges of shrouds 22 being cut away as is indicated at 36 to provide passage through which liquid may flow to the spaces between the impeller vanes 21.

The areas of all passages between the liquid reservoir 5 and tube 12, that is, the areas of passages 35, diffuser 25, and passage 27, are made equal to or greater than the area of the bore of tube 12 so as to remove any restrictions in the systems and allow for the free and quick passage of the liquid up and down the tube. This helps reduce to a minimum the time lag of the instrument, that is, the response of the liquid column in tube 12 to speed changes.

In the use of the instrument, a suitable amount of liquid such as oil is placed in reservoir 5, oil from the reservoir flowing through passages 35 to the impeller. Now when shaft 15 is rotated, liquid is pumped by the impeller through the diffuser ring 25 to discharge chamber 26, and from this chamber through passage 27 to tube 12. The impeller establishes a head of liquid in tube 12 which bears a definite relation to the speed at which it rotates as is well understood by those familiar with tachometers of the type to which our invention relates.

By utilizing an impeller having a large axial width compared to its diameter, we provide a construction wherein free and rapid circulation of the liquid will take place in response to increase and decrease of speed whereby time lag in the response of the liquid column to change in speed is reduced to a minimum.

When the instrument is operating, the pressure for moving the liquid column in tube 12 is taken off, substantially midway between the upper and lower sides of the impeller. With any impeller there are certain disturbances at its sides where the fluid flows from the impeller exit through the clearance spaces at the sides of the impeller back to the inlet in a short circuit. Such disturbances which are more or less irregular, affect the pressure rise at the points where they occur. By using a comparatively wide impeller and taking off the pressure rise for the column at its central region, the pressure utilized will not be affected by the disturbances referred to and will be dependent only on the speed of rotation of the impeller.

Reservoir 5 is quite large in area compared to the area of tube 12 so that the change in level which takes place in the reservoir when the instrument is used is small. Throughout the portion of the reservoir in which the change in level takes place, indicated in the drawing by the distance $x$, the reservoir has a constant cross-section. This enables the zero setting to be varied appreciably without introducing any error.

We have found that by providing a diffuser as is indicated at 25 through which the impeller discharges liquid to the tube, that the accuracy of the instrument is then not affected by slight variations in the construction of the impeller such as would be met with in commercial manufacture. Furthermore, we have found that the instrument is equally accurate no matter in which direction the impeller rotates. Also, we have found that by using shrouds such as the shrouds 22 on the impeller that the accuracy of the instrument is affected practically not at all by small axial differences in the position of the impeller. This enables the impeller to be assembled without special reference to its exact position axially in the impeller chamber, and enables us to do away entirely with a special means for adjusting the impeller axially. In this connection, however, it is important that the impeller be prevented from jumping up and down during operation for even slight axial jumping movements will affect adversely the accuracy of the instrument. The spring thrust bearing for shaft 15 serves to keep the impeller constantly in its given location and to take up automatically any wear in the bearings, thus doing away with the possibility of errors due to this cause. Also, we have found that the accuracy of the instrument is not affected to any great extent by slight variations in the width of the diffuser passage 25.

In view of the foregoing, therefore, the instrument may be assembled from machine manufactured parts and without regard to any special fitting for the particular instrument. This is a thing of great importance, of course, from a manufacturing standpoint. In view of the fact that slight inaccuracies in the adjustment of the parts do not affect materially the operation of the instrument, it will be clear that after having been calibrated initially, slight variations in the positions of the parts, due to any reason, will not affect materially the reading of the instrument.

From a mechanical standpoint, it will be seen that the arrangement of the instrument is such that it can be assembled and dismantled readily, which serves to make the instrument easy to manufacture and to repair. Also, since reservoir 5 is sealed except for the clearance space around shaft 30, and tube 12 is sealed at its top by overflow tube 33, there is provided a dust-proof instrument and one wherein there is a minimum chance for evaporation of the fluid.

In accordance with the provisions of the patent statutes, we have described the principle of operation of our invention, together with the apparatus which we now consider to represent the best embodiment thereof, but we desire to have it understood that the apparatus shown is only illustrative and that the invention may be carried out by other means.

What we claim as new and desire to secure by Letters Patent of the United States, is:

1. In a liquid tachometer, the combination of a shaft, an impeller on the shaft, walls forming a casing for the impeller, journal bearings for the shaft, a discharge chamber, a diffuser connecting the impeller chamber to the discharge chamber, said diffuser comprising an uninterrupted annular passage, a thrust bearing for the shaft, spring means which holds the shaft against the thrust bearing to prevent end play of the shaft, means for rotating the shaft, means for supplying liquid to the impeller, and a pressure measuring tube which communicates with the discharge chamber.

2. In a liquid tachometer, the combination of a shaft, an impeller on the shaft, said impeller having large axial width compared to its diameter, walls forming an impeller chamber, a discharge chamber, a diffuser which connects the middle portion of the impeller chamber to the discharge chamber, said diffuser comprising an uninterrupted annular passage having parallel flat sides, with a rounded approach, and extending in the direction of the axis of the impeller until it meets said discharge chamber, a pressure-measuring tube which communicates with said discharge chamber, means for rotating the shaft, and means for supplying liquid to said impeller.

3. In a liquid tachometer, the combination of a shaft, an impeller on the shaft, walls forming an impeller chamber, a discharge chamber, a diffuser which connects the middle portion of the impeller chamber to the discharge chamber, said diffuser comprising an uninterrupted annular passage having parallel flat sides, with a rounded approach, and extending in the direction of the axis of the impeller until it meets said discharge chamber, a pressure-measuring tube which communicates with said discharge chamber, means for rotating said shaft, and means for supplying liquid to said impeller.

4. In a liquid tachometer, the combination of a shaft, an impeller on the shaft, said impeller being provided with straight radially extending blades with shrouds on both sides, both of said shrouds having openings at the center to allow fluid to enter the impeller from either side, walls forming an impeller chamber, a discharge chamber, a diffuser which connects the impeller chamber to the discharge chamber, said diffuser comprising an uninterrupted annular passage, a pressure-measuring tube which communicates with said discharge chamber, means for rotating said shaft, and means for supplying a liquid to said impeller.

5. In a liquid tachometer, the combination of a shaft, an impeller on the shaft, said impeller having an axial width greater than one-third its diameter, walls forming an impeller chamber, a discharge chamber, a diffuser which connects the impeller chamber to the discharge chamber, said diffuser comprising an uninterrupted annular passage, a pressure-measuring tube which communicates with said impeller chamber, means for rotating said shaft, and means for supplying liquid to said impeller.

6. In a liquid tachometer, the combination of a shaft, an impeller on the shaft, said impeller comprising a shaft and radially extending vanes on the shaft, walls forming an impeller chamber, a discharge chamber, a diffuser which connects the impeller chamber to the discharge chamber, said diffuser comprising an uninterrupted annular passage, a pressure measuring tube which communicates with said impeller chamber, means for rotating said shaft, and means for supplying a liquid to said impeller.

In witness whereof, we have hereunto set our hands this 24th day of December 1926.

SAMUEL R. PUFFER.
SANFORD A. MOSS.